2,902,477
TREATMENT OF PERFLUOROCHLOROOLEFIN POLYMERS

Edgar Fischer, Klaus Weihsermel, and Gerhard Bier, Frankfurt am Main, Germany, assignors to Farbwerke Hoechst Aktiengesellschaft vormals Meister Lucius & Brüning, Frankfurt am Main, Germany, a corporation of Germany No Drawing. Application August 7, 1956
Serial No. 602,497

Claims priority, application Germany September 26, 1955

5 Claims. (Cl. 260—92.1)

This invention relates to the treatment of perfluorochloroolefin polymers. In one aspect the invention relates to the stabilization of polymers of trifluorochloroethylene. In another aspect the invention relates to a method for improving the shortwave length light transmission of polymers of trifluorochloroethylene.

Plastic polymers of trifluorochloroethylene have remarkably good physical and chemical properties. Polymers of trifluorochloroethylene can be molded, by extrusion, injection, transfer and compression techniques, into shaped articles of glass-clear transparency which, in addition to having good mechanical properties, have extraordinary chemical resistance. These polymers are resistant even to extremely corrosive substances, such as free fluorine and halofluorides even in the presence of hydrofluoric acid. Polymers of trifluorochloroethylene, at the present time, are the only clear light-transmitting plastics which can be used in contact with these highly corrosive substances.

It has been found that shaped articles produced from these polymers exhibit certain differences in their properties depending on the method by which they have been produced. In other words, they have, inter alia, a better or poorer ability to transmit light radiation of short wave length. The expression light radiation of short wave length includes the visible blue and violet region as well as the adjacent ultra violet region and particularly the region between 300 and 500 m$\mu$. Transmission of light of short wave length is important in many fields. For example, in carrying out photochemical reactions, using radiation of a mercury lamp, the highest possible transmittance for such rays is desired.

It is also interesting to note that, at times, a lower transmittance for short wave light is related to a decreased mechanical, chemical and thermal stability, as can be noted, for instance, from the fact that when processing at the customary high temperatures, for instance at 300° C., there can be noted the formation of a certain amount of gas which reduces the usefulness of the shaped articles. The reduced chemical stability has the result that the polymer in the form of the shaped bodies reacts to a certain extent with corrosive agents particularly under the simultaneous action of light of short wave length, while other polymer specimens are stable. Investigation has shown that this reduced light transmittance, which is frequently related to chemical instability, is evidently due to the presence of a very small number of unstable groups. These unstable groups are, for instance, double bonds and foreign groups from traces of catalyst and other polymerization additives in addition to other unknown groups. The unstable groups which are present at the start in the polymer result apparently during processing, in the formation of further unstable groups so that the light transmittance becomes smaller as the processing conditions become more severe. These groups frequently occur in these case of polymers of trifluorochloroethylene which are made from monomer which is not entirely pure. Polymers of trifluorochloroethylene which have been prepared in accordance with the aqueous emulsion or suspension method also frequently contain unstable groups.

It is an object of this invention to provide a process for improving the thermal stability of polymers of trifluorochloroethylene.

It is another object of this invention to provide a means for stabilizing polymers of trifluorochloroethylene.

It is another object of this invention to improve the short wave light transmittance of polymers of trifluorochloroethylene.

Various other objects and advantages will become apparent to those skilled in the art on reading the accompanying description and disclosure.

It has now been found that polymers of trifluorochloroethylene of high transmittance for light radiation of short wave length can be obtained by heating a polymer of trifluorochloroethylene for a period of time between about 1 minute and about 24 hours at temperatures between 20° and 200° C. in layer thicknesses of between 0.01 and 30 mm. in the presence of an atmosphere which contains ozone.

In U.S. Patent 2,392,389, there is described an after treatment of polytetrafluoroethylene with gaseous oxidizing agents in order to avoid heat discoloration. The conditions recommended there, for instance ½ hour at 350 to 425° C. with air, are not successful in the case of polytrifluorochloroethylene, since polytrifluorochloroethylene decomposes under these conditions. Even at lower temperatures, treatment with oxygen is not successful. Other oxidizing agents such as $Cl_2$, $NO_2$, $ClF_3$ are not able to remove unstable groups from ploymers of trifluorochloroethylene. These oxidizing agents are stated to be equivalent to ozone in the above-mentioned patent. Since hot air and hot chlorine gas do not have any action on polytrifluorochloroethylene or even have a destructive action on it at high temperatures, it was extremely surprising to find, in accordance with the present invention, that ozone is able, if the temperatures are suitably selected, to react with the unstable groups and block them in such a manner that no further degradation takes place as a result thereof. This effect is also surprising for the reason that ozone is frequently used in organic reactions to split the active sites, such as double bonds. Since no appreciable degradation takes place, the viscosity in solution and the NST value [1] are practically the same before and after the ozone treatment.

---
[1] Defined in Slesser and Schram "Preparation Properties and Technology of Fluorine and Organic Fluoro Compounds," McGraw-Hill Book Co., Inc., New York, 1951, page 641.

The treatment of the trifluorochloroethylene polymer is effected advisedly in finely divided form, for instance as powder, in small layer thicknesses (between 0.01 and 30 mm.), preferably with continuous renewal of the surface or mixing of the material, for instance by means of an agitator. Ozone is used in the form of ozonized air or ozonized oxygen, preferably having an ozone content of 0.1 to 10%. The method is preferably carried out at atmospheric pressure, but reduced or elevated pressure can also be used. The temperature range in which the method is carried out is between 20 and 200° C. and preferably between 100 and 150° C. The treating time is between about 1 minute and about 24 hours depending principally on the state of division and the thoroughness of the mixing of the reaction material and preferably between about 3 minutes and about 5 hours. The treating time can be in excess of 24 hours although no particular advantage results from such prolonged treatment.

This process can also advantageously be carried out continuously, by conducting trifluorochloroethylene polymers continuously through a heated apparatus on suitable conveying means in an atmosphere which contains ozone. The treating apparatus is advisedly of tubular or tunnel shape. The polymers can be conveyed in this apparatus on metal bands, fine meshed screens, or by means of a screw or by vibration. Furthermore, treatment in an eddy layer is possible. The gas containing the ozone can be conducted in parallel current, countercurrent or cross-current to the reaction material or else mixed. It is advantageously continuously passed through the apparatus at a low gauge pressure of 5 to 20 mm. water column. The rate of flow is advisedly within the range of 0.01 to 1.0 meters per second.

This process can also be applied to copolymers of trifluorochloroethylene and hydrogen-poor monomers, particularly those having a high halogen content. These products can also be freed from disturbing groups by ozone treatment. The process is further applicable to polymers of trifluorochloroethylene of varying molecular weights, i.e., thermoplastic solids, waxes and oils.

In order to more fully illustrate the process of this invention, the following example, which is not to be construed as unnecessarily limiting the invention, is presented.

Example

In a closed glass vessel, provided with an agitator and with a gas feed and a gas discharge pipe, 100 parts by weight of a powdered homopolymer of trifluorochloroethylene of a particle size of between 0.05 and 0.1 mm. are brought by means of a heating bath to the reaction temperature and ozonized oxygen containing about 5% ozone is passed through the reaction vessel. After the termination of the reaction time, the powder is allowed to cool in a stream of air (yield: 100 parts by weight) and then pressed, under standard conditions, into sheets of a thickness of 1 mm.. The light transmittance of this sheet is then determined at 300, 360, 400 and 800 microns ($\mu$) in percent referred to air as being equal to 100%. The following values were found:

| Treatment | | Light Transmittance in Percent (referred to Air as 100%) | | | | NST | Specific Viscosity |
|---|---|---|---|---|---|---|---|
| Time | Temp., °C. | 300 $\mu$ | 360 $\mu$ | 400 $\mu$ | 800 $\mu$ | | |
| untreated | | 11.2 | 20.3 | 41.2 | 91.3 | 250 | 1.2 |
| 1 hour | 175 | 50.2 | 75.8 | 80.2 | 91.7 | 251 | 1.1 |
| 3 hours | 175 | 59.3 | 77.2 | 78.1 | 91.5 | 247 | 1.1 |
| untreated | | 40.2 | 66.9 | 74.1 | 91.4 | 301 | 1.38 |
| 10 minutes | 150 | 57.7 | 77.6 | 79.2 | 90.6 | 305 | 1.37 |
| 1 hour | 150 | 59.3 | 75.7 | 81.4 | 92.3 | 304 | 1.35 |
| 10 minutes | 100 | 55.8 | 72.3 | 80.3 | 92.2 | 302 | 1.42 |
| 1 hour | 100 | 61.0 | 76.0 | 83.3 | 93.3 | 305 | 1.31 |

When ozonized air is used instead of ozonized oxygen, similar values are obtained.

Various modifications and alterations of the process of this invention will be apparent to those skilled in the art and may be used without departing from the scope of this invention.

Having thus described our invention, we claim:

1. A process for treating a homopolymer of trifluorochloroethylene which comprises maintaining said polymer in a layer thickness between about 1 and about 10 mm. at a temperature about 100° C. and about 150° C for a period of time between about 3 minutes and about 5 hours in ozonized air containing between about 0.1 and about 10 percent of ozone.

2. A process for treating a homopolymer of trifluorochloroethylene which comprises maintaining said polymer in a layer thickness between about 1 and about 10 mm. at a temperature about 100° C. and about 150° C. for a period of time between about 3 minutes and about 5 hours in ozonized oxygen containing between about 0.1 and about 10 percent of ozone.

3. A process for treating a polymer consisting essentially of polytrifluorochloroethylene which comprises maintaining said polymer at a temperature between about 20° C. and about 200° C. and intimately contacting said polymer in finely divided form in an ozonized atmosphere containing at least 0.1 percent ozone.

4. The product of the process of claim 3.

5. A process for treating a polymer consisting essentially of polytrifluorochloroethylene which comprises maintaining said polymer in a layer thickness of between about 0.01 and about 30 mm. at a temperature between about 20° C. and about 200° C. for a period of time between about one minute and about twenty-four hours in an ozonized atmosphere containing at least 0.1 percent ozone.

References Cited in the file of this patent

UNITED STATES PATENTS

| 2,122,826 | Van Peski | July 5, 1938 |
| 2,392,389 | Joyce | Jan. 8, 1946 |
| 2,461,966 | Davis | Feb. 15, 1949 |